Jan. 9, 1945. S. P. STEPHEN 2,367,151
FOUR WHEEL DRIVE ASSEMBLY FOR TRUCKS
Filed June 28, 1943 2 Sheets-Sheet 1
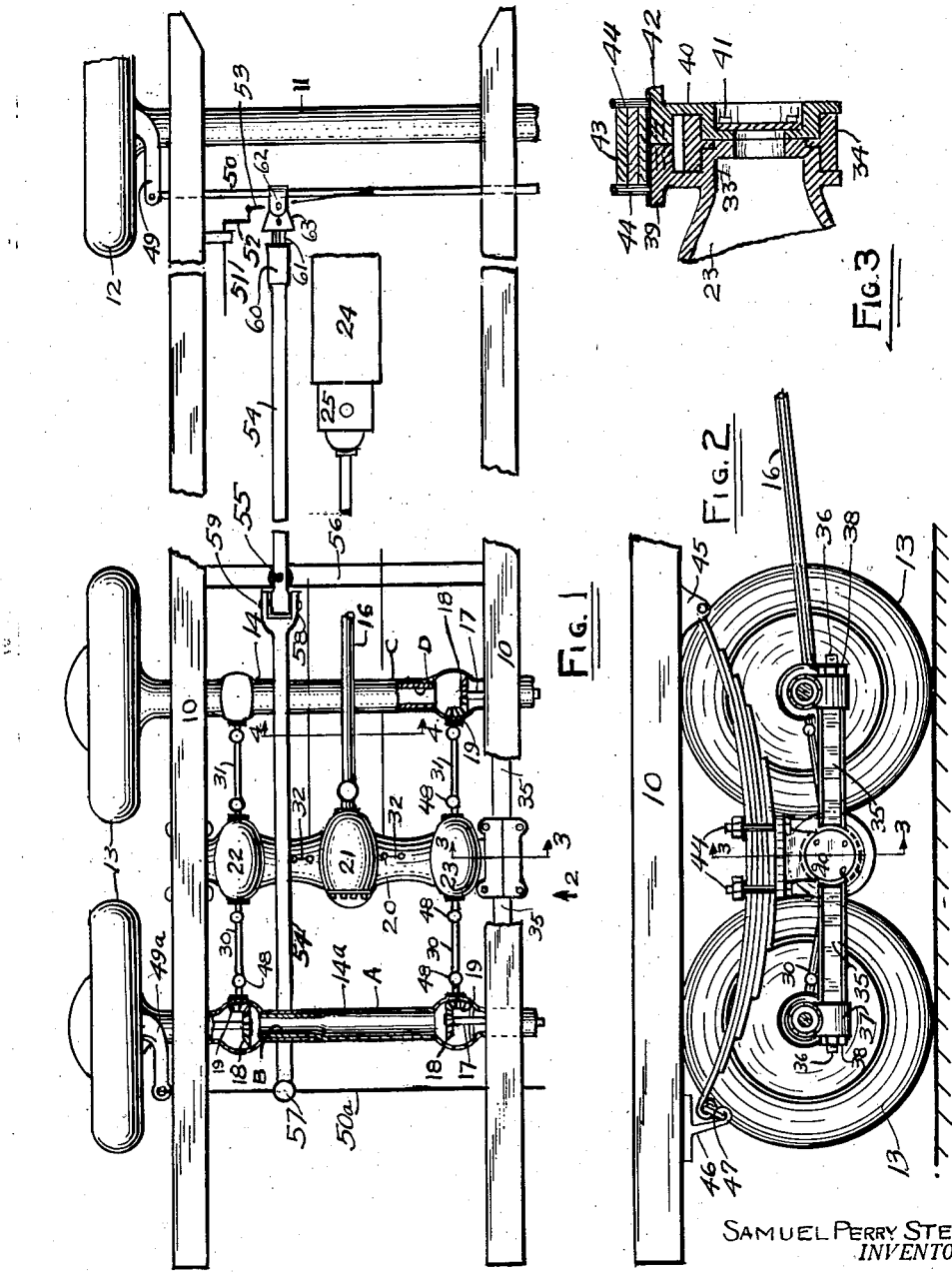
SAMUEL PERRY STEPHEN
INVENTOR.
BY
Martin E. Anderson
attorney Jan. 9, 1945. S. P. STEPHEN 2,367,151
FOUR WHEEL DRIVE ASSEMBLY FOR TRUCKS
Filed June 28, 1943 2 Sheets-Sheet 2
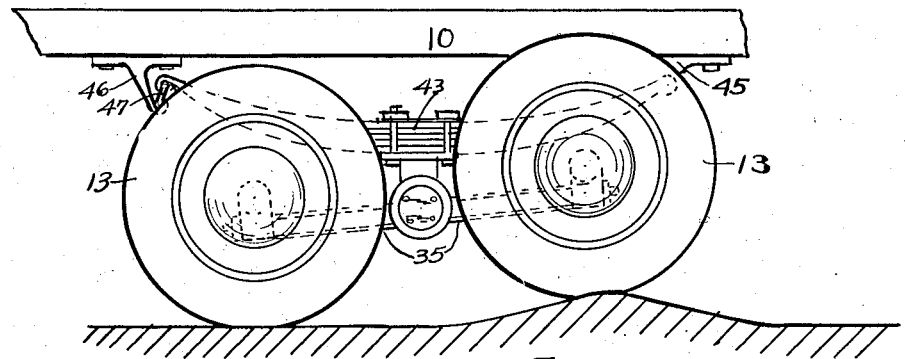
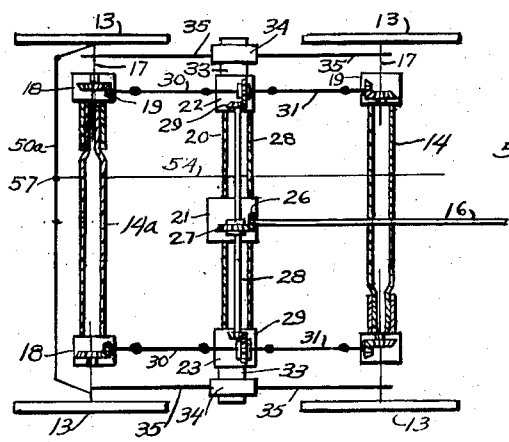
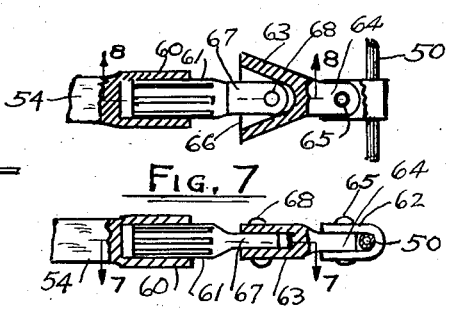
Samuel Perry Stephen
INVENTOR.

Patented Jan. 9, 1945

2,367,151

UNITED STATES PATENT OFFICE 2,367,151

FOUR WHEEL DRIVE ASSEMBLY FOR TRUCKS

Samuel Perry Stephen, Denver, Colo.

Application June 28, 1943, Serial No. 492,633

4 Claims. (Cl. 180—24)

This invention relates to improvements in heavy duty trucks.

The use of trucks for transporting freight is quite common and for such purposes it is necessary to have trucks that can support heavy loads and which are of such construction that they can travel over uneven surfaces and which, in addition, have a large amount of traction.

It is customary to manufacture high duty trucks in such a way as to provide two parallel spaced rear axles, each having a single wheel at each end and some times duplex wheels. Occasionally the trucks are so constructed that both sets of wheels are employed for driving and in other cases one pair of the rear wheels are merely employed as supports for the load.

Trucks having four rear wheels arranged on spaced parallel axles are difficult to steer because, in order to negotiate curves, the tires of at least one pair of wheels must slide transversely, which increases the wear and introduces an element of danger as such trucks are likely to get out of control at curves. It is one object of this invention to produce a truck having a four-wheel drive at the rear and in which the four-wheel truck assembly is so constructed that either one or the other pair of wheels are dirigible to such an extent that they can be adjusted sufficiently to prevent sliding in going around curves in the road.

Another object of this invention is to produce a truck having a four-wheel drive that shall be so constructed that either one of the wheels may be raised or lowered independently of the others so as to conform to the road surface.

A still further object of this invention is to produce a four-wheel drive truck in which each wheel may rotate at a different speed than any of the other wheels and which therefore eliminates the danger of sliding the tires in going over uneven surfaces or around curves.

A still further object of this invention is to produce a truck construction in which the load is supported on the axles at points near the wheels so as to reduce axle bending strains to a minimum.

Another object of this invention is to produce a truck in which the differential may be locked on one side or the other to prevent stalling on roads where the wheels on one side lose their traction due to ice or mud.

Another object of the invention is to produce a truck having a pair of front wheels that are dirigible and controlled by means of an ordinary steering mechanism and one pair of rear wheels that are also dirigible and interconnected with the steering mechanism in such a way as to permit a limited movement of the front wheels before the rear dirigible wheels are moved.

This invention is a continuation in part of applicant's copending application which matured into Patent No. 2,339,960, granted January 25, 1944.

The above and other objects that may become apparent as this description proceeds are attained by means of a construction and an arrangement of parts that will now be described in detail, and for this purpose reference will be had to the accompanying drawings in which one embodiment of the invention has been illustrated, and in which:

Figure 1 is a top plan view partly in section, showing the improved truck construction;

Figure 2 is a partial side elevation looking in the direction of arrow 2, in Figure 1;

Figure 3 is a section taken on line 3—3, Figure 1;

Figure 4 is a section taken on line 4—4, Figure 1;

Figure 5 is a view similar to that shown in Figure 2, but shows the position of the wheels in going over uneven road surfaces;

Figure 6 is a diagrammatic representation showing the relationship of the various parts;

Figure 7 is a section taken on line 7—7, Figure 8, showing a detail of the front portion of the steering rod and Figure 8 is a section taken on line 8—8, Figure 7.

In the drawings reference numerals 10 designate the side members of the chassis frame and numeral 11 the front axle. The front wheels have been designated by reference numeral 12 and the rear drive wheels by reference numeral 13. The construction of the wheel hub and the mechanism by which power is transmitted to the dirigible wheels is shown and described in my copending application, Serial No. 416,772, filed October 27, 1941, and will therefore not be described herein. The construction of the front axle and its attachment to the chassis frame involves nothing new and will therefore not be described to any greater extent than found necessary for the purpose of describing the present invention.

The rear end of the truck chassis is supported on an assembly comprising four drive wheels 13, one wheel being connected to each end of axle housings 14 and 14a. It will be observed that the axle housings are formed in two sections. The two sections "A" and "B" of housing 14a are telescopically connected in the manner shown and may be provided with suitable means to resist longitudinal separation, although this has not been indicated on the drawing. Sections "A" and "B" may rotate slightly about the telescopic joint. Axle housing 14 is similar to axle housing 14a, but has a downwardly curved part 15 to prevent interference with the drive shaft 16. The relationship of these two parts has been shown in Figure 4. Axle 14 is also formed from two sections which have been designated by letters "C" and "D." These two sections are telescopically connected in the manner explained in connection with axle 14a. A stub shaft 17 is mounted for rotation in the outer end of each axle and these are operatively connected with the drive wheels. The inner ends of the stub shafts are provided with bevel gears 18 that are engaged by bevel pinions 19. Positioned between the two axles is a differential housing 20. This housing is provided with three enlargements designated by reference numerals 21, 22 and 23. Positioned within each of these enlargements is a differential gear of the ordinary construction and which has been shown diagrammatically in Figure 6. These gears have not been illustrated in detail, because they are of conventional construction and in all substantial respects are similar to that illustrated in Figure 1 of U. S. Patent No. 1,243,720, granted October 23, 1917. This patent also illustrates a certain differential lock which is employed in the present invention and to which reference will hereinafter be made. The truck carries a motor 24 that transmits power through the ordinary transmission gears positioned in housing 25, to the differential located at 21 in the differential housing 20. The drive shaft 16 is provided with a pinion 26 that cooperates with the ring gear 27 in differential housing 21, and from this differential shafts 28 extend laterally to the differentials in enlargements 22 and 23, where they transmit power to the ring gears 29. Differential shafts 30 and 31 extend rearwardly and forwardly, respectively, from the differentials at the ends of differential housing 20 and are provided with pinions 19 that cooperate with the bevel gears 18. Differential in enlargement 21 is provided with locking mechanisms similar to that shown in the patent above identified and which are controlled by levers 32 that extend through the differential housing, as shown in Figure 1. The differential lock has not been illustrated in Figure 6 as it would complicate this figure and serve no useful purpose.

The ends of the differential housing are provided with trunnions 33 on which rocker arms are pivoted, each rocker arm consists of a central bearing 34, from which I-beams or channels 35 extend both rearwardly and forwardly. The ends of the beams 35 are provided with trunnions 36 that pass through bearings 37 on the under sides of the axle housings 14 and 14a. Nuts 38 or other equivalent means hold the rocker arms in assembled relation with respect to the axle housings. In Figure 3, a cross section through one of the trunnions 33 and the corresponding bearing 34 has been shown. From this it will be seen that the housing has an upwardly extending bracket 39 and that a removable abutment plate 40 is secured to the outer end of the axle housing by bolts 41. The upper end of the plate 40 has a bracket portion 42 that cooperates with 39 to form a flat surface on which the multileaf spring 43 is supported. Bolts 44 hold the spring in position in the usual manner, as shown in Figure 2. The front end of the spring is connected with the under side of the corresponding side frame 10 by means of a bracket 45 and the rear end is connected to the frame by means of a bracket 46 and a shackle 47, or by other suitable means such as a slide. The trunnions 36 are rotatable in the bearings 37, at least to a limited extent, and the differential shafts 30 and 31 are each provided with two universals 48. When the four drive wheels 13 rest on a flat surface, the axes of the two axles are contained in a flat plane, but when either one of the wheels is raised or lowered the plane containing the axes of the axles is warped. During this warping, there is a slight rotary movement between the sections "A" and "B" of axle 14a and "C" and "D" of axle 14 and there is also a slight rotary movement between the trunnions 36 and the bearings 37 and at the same time the central bearing 34 of the rocker arm will rotate on the trunnion 33. The position of the parts when the front drive wheel on one side passes over an elevation in the road way can be seen from Figure 5. Since a straight line is the shortest distance between two points, it is evident that the wheel that passes over any elevation or over a depressed area in a roadway will travel a greater distance than the rear wheel which travels on the flat surface and this variation is compensated for by the differential drive connecting the two wheels.

The front wheels are provided with a steering mechanism comprising the arms 49, a connecting rod 50, a steering post 51, a crank arm 52 and a connecting rod 53. This steering mechanism is of the ordinary and well known construction and has merely been illustrated in a diagrammatic manner so as to facilitate the description. The rear pair of drive wheels 13 are also mounted for limited steering movement and are each provided with an arm 49a that is joined by a tie rod 50a. A long tongue or lever 54 is pivoted at 55 to a transverse frame member 56 and has its rear end connected with the tie rod 50a by some suitable means which has been indicated by numeral 57. The tongue is formed of two parts hinged at 58 for movement about a horizontal pivot 59. The front end of the tongue has a splined socket 60 in which a splined plug 61 is slidably mounted. A U-shaped clip 62 is secured to the tie rod 50 by welding or other suitable means. A connector element 63 has a flattened end 64 that is positioned between the two rearwardly extending arms of member 62 and is pivotally connected with the latter by means of a pin 65. The connector element is provided in its rear end with a flattened V-shaped opening 66 into which the flattened front end 67 of the splined plug 61 extends and in which it is secured by a pin 68. When the tie rod moves longitudinally, it carries with it the pivot 65 but permits the connector 63 to rock about its pivot 68 until the sides of part 67 engage the end walls of the opening 66, when it moves the splined plug and the front end of the tongue laterally. The construction just described allows the tie rod 50 to have a limited movement in either direction before it effects an adjustment of the dirigible drive wheels 13. This lost motion connection allows the front wheels to move sufficient for ordinary straight road driving. When the curvature of the road, as at corners, exceeds a predetermined amount, the rear wheels are adjusted. If the front wheels are turned so as to cause the truck to turn towards the right, the dirigible rear wheels are turned in the other direction, but to a lesser extent. The ratio movement between the two steering mechanisms depends on the relative lengths of the lever arms on opposite sides of pivot 56 and is calculated in such a way that there will be no sliding of the tires on the rear drive wheels in negotiating curves. Since the rear drive wheels will travel along a circle having a larger radius than the front drive wheels they will rotate at a faster speed and this differential in rotation is compensated for by the action of the two differentials at the ends of differential housing 20.

The interconnecting means between the two steering mechanisms which has been shown and described is merely illustratative, and a mechanical equivalent may be substituted if desired.

With the present construction, the load points can be very close to the wheels and this will reduce any tendency to bend the axle housings.

Particular attention is called to the location of the differential housing 20, and to the fact that the load is supported directly from the ends of this housing by means of the springs and to the fact that the two axles are pivoted about the trunnions at the ends of the differential housing so as to permit ready and free adjustment to road surface variations. As above explained, when the wheels move vertically with respect to each other, the warping action that takes place creates a slight rotary motion between the two sections of the axle housings and also between the rocker arms and the axle housings and means to take care of this relative rotary motion has been provided.

The trunnion construction shown in Figure 3 is more or less diagrammatic as the invention relates to the general rather than the specific structure.

The rocker arms 35, in addition to transferring the load to the wheels and keeping the axles properly spaced, also serve as means for resisting the torque strains and must therefore be quite massive and rigid. The front axle may be somewhat downwardly bowed at the center if found desirable.

Attention, in particular, is called to the fact that the wheels are driven independently from the end differentials and that very heavy torque strains are set up which tend to rotate the axle housings. The torque strains are resisted by the bar 35 whose end trunnions 36 are positioned in the bearings 37. When one wheel is vertically displaced as shown in Figure 5, the two sections of the axle housing must rotate relative to each other because it is not permissible to allow the axle housings to turn relative to bars 35 since one function performed by the latter is to prevent such rotation.

Having described the invention what is claimed as new is:

1. A four-wheel drive truck assembly comprising a differential housing and two axle housings arranged in spaced relation with the differential housing between them, each axle housing comprising at least two relatively rotatable sections, three spaced differential gears in the differential housing, the central differential having the ring gear in a plane perpendicular to the axis of the housing, the differentials at the ends having the ring gears in planes parallel with the axis of the housing, the axle housings having stub shafts mounted in each end, a bevel gear on each stub shaft, drive shafts connecting the end differentials with the bevel gears of the stub shafts, the differential housing having each end provided with a trunnion, a rocker bar connected with each trunnion for rocking movement thereabout, the end sections of the axle housings having fixed transverse bearings, the rocker arms having their ends provided with trunnions for insertion into said bearings, whereby the rocker bars serve to resist forces tending to rotate the axle housings and to maintain the latter in a predetermined fixed relation while permitting rocking about the differential housing trunnions.

2. A truck assembly having two pair of drive wheels operatively connected with spaced axle housings, a power transmission unit comprising a differential housing having three differential mechanisms, one adjacent each end, and one intermediate the other two, the intermediate differential having a ring gear positioned in a plane perpendicular to the axis of the housing, and shafts extending parallel with the axis, the differentials at the ends having ring gears rotatable in planes parallel with the axis of the housing, and shafts extending in opposite directions from each of said end differentials, each pair of wheels having an axle housing substantially parallel with the differential housing, one being positioned in front and the other to the rear of the latter, the axle housings comprising at least two relatively rotatable sections, each end section having a stub shaft, a bevel gear on each stub shaft, the four shafts projecting from the differential housing having each a bevel pinion in operative engagement with one bevel gear, each end of the differential housing having a trunnion, a rocker bar at each end of the differential housing, having a central bearing for receiving said trunnion, the ends of the rocker bars being connected with the end sections of the axle housings by means permitting a slight rotary motion about the axis of the rocker bar, and means for transmitting power to the ring gear of the central differential.

3. A four-wheel drive assembly for trucks comprising two spaced, substantially parallel axle housings, each having at least two relatively rotatable sections, a drive wheel and a stub shaft rotatably connected with each end of each axle housing, a differential housing positioned between the axle housings, three differential gears positioned in the last named housing, one at each end and one in an intermediate position, the end differential gears being operatively connected with the corresponding drive wheels, a rigid rocker bar pivoted to the ends of the differential housing, the ends of the rocker bar being connected with the corresponding axle housing end sections for limited relative rotation about an axis perpendicular to the axle housing axis, said rocker bar serving as means to resist torque strains tending to turn the axle housings during truck operation and to maintain the two axle housings in a predetermined spaced relation.

4. A four-wheel drive truck assembly comprising two spaced parallel axle housings, each housing comprising at least two sections rotatable relative to each other, a stub shaft in each axle housing end, a drive wheel operatively connected with each stub shaft, a differential housing positioned between the axle housings, three operatively interconnected differential gears in the differential housing, one at each end and one at an intermediate position, the center differential having its ring gear in a plane perpendicular to the axis of the housing and the other differential gears having their ring gears in a plane parallel to said housing axis, means for transmitting motion from the end differential gears to the correspondingly positioned stub shafts and drive wheels, the ends of the differential housing having trunnions, rocker bars pivoted intermediate their ends to said trunnions, the ends of the rocker bars having trunnions, the end sections of the axle housings having fixed bearings whose axes are substantially perpendicular to the axle housing axis, each of the last named bearings having positioned therein a rocker bar trunnion, whereby the axle housings may be rocked relative to each other and whereby the torque strains applied to the drive wheels will be resisted by said rocker bar.

SAMUEL PERRY STEPHEN.